Dec. 30, 1969  W. C. GALLAGHER  3,486,962
REINFORCED RUBBER BANDS, ETC.
Filed April 6, 1966  4 Sheets-Sheet 1

INVENTOR.
WILLIAM C. GALLAGHER
BY
J.B. Holden
ATTORNEY

Dec. 30, 1969  W. C. GALLAGHER  3,486,962
REINFORCED RUBBER BANDS, ETC.
Filed April 6, 1966  4 Sheets-Sheet 2
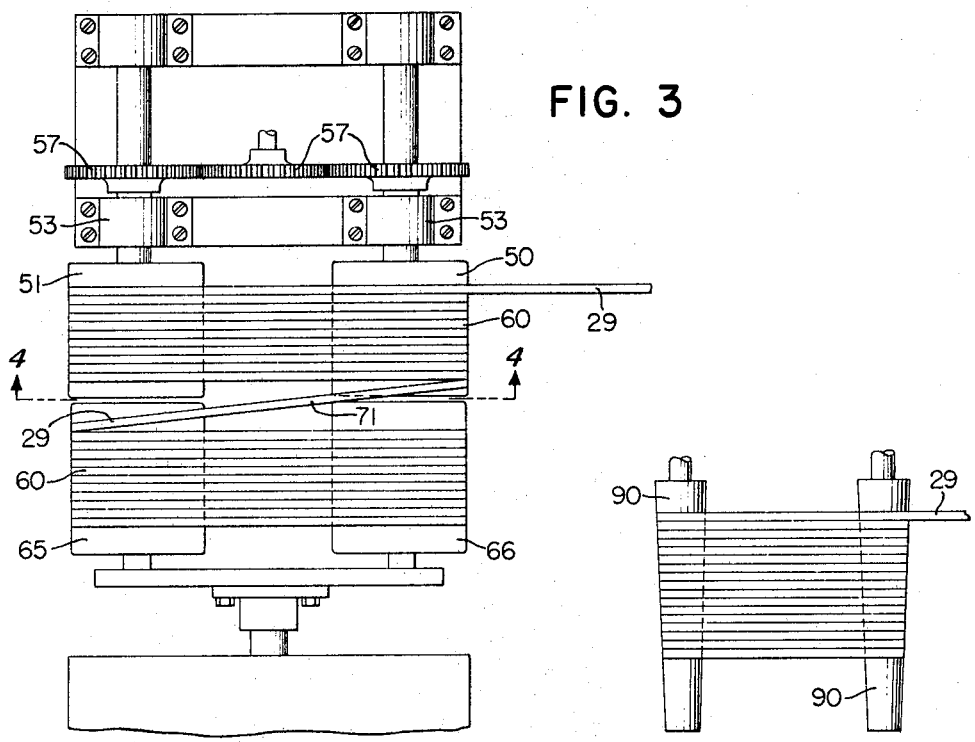
FIG. 3
FIG. 8
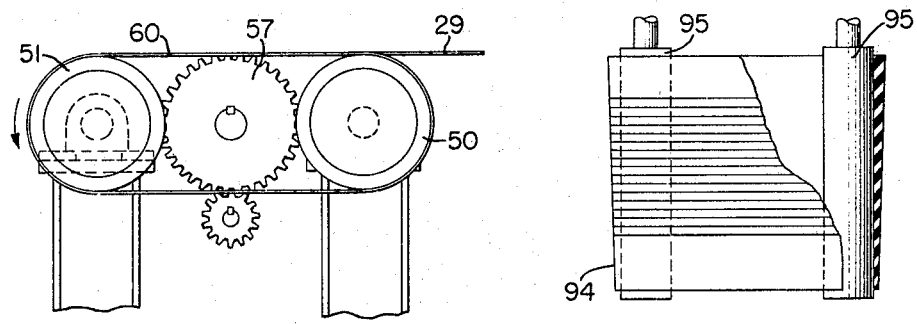
FIG. 4
FIG. 9
INVENTOR.
WILLIAM C. GALLAGHER
BY
J. B. Holden
ATTORNEY Dec. 30, 1969     W. C. GALLAGHER     3,486,962
REINFORCED RUBBER BANDS, ETC.
Filed April 6, 1966     4 Sheets-Sheet 3
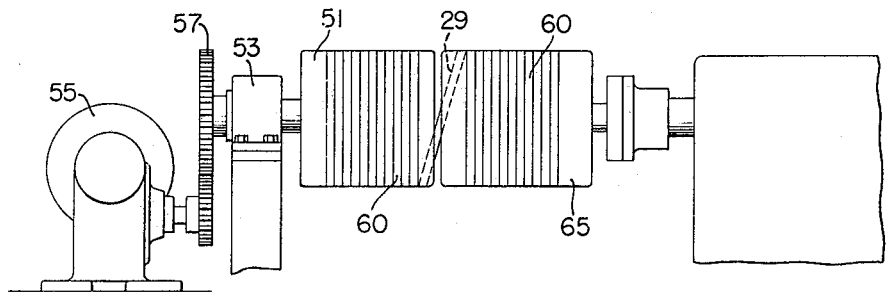
FIG. 5
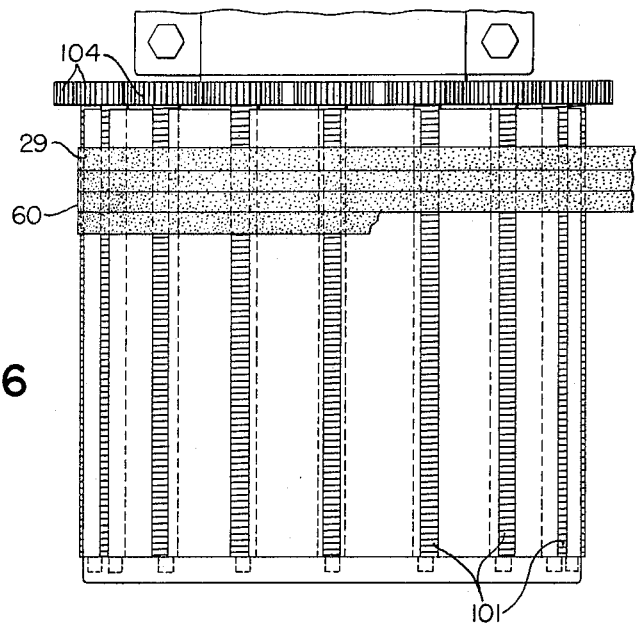
FIG. 6
FIG. 7
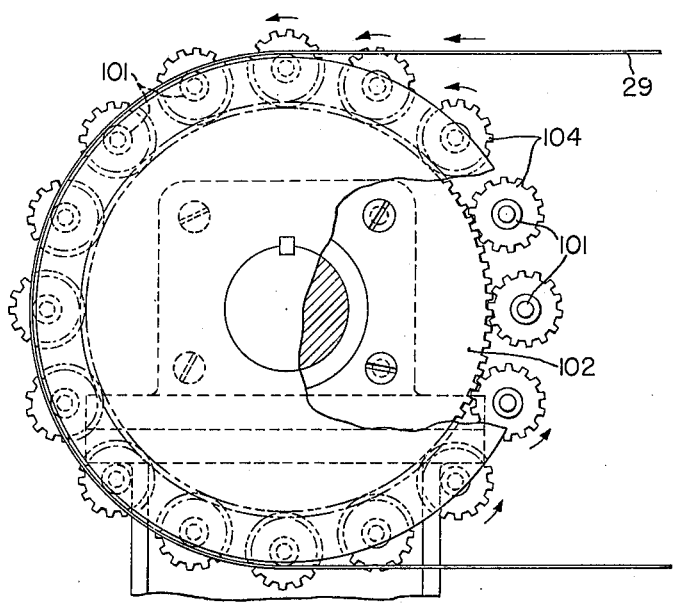
INVENTOR.
WILLIAM C. GALLAGHER
BY
J.B. Holden
ATTORNEY Dec. 30, 1969      W. C. GALLAGHER      3,486,962

REINFORCED RUBBER BANDS, ETC.

Filed April 6, 1966      4 Sheets-Sheet 4

INVENTOR.
WILLIAM C. GALLAGHER
BY
J. B. Holden
ATTORNEY

United States Patent Office 3,486,962
Patented Dec. 30, 1969

3,486,962
REINFORCED RUBBER BANDS, ETC.
William C. Gallagher, Akron, Ohio, assignor to The Goodyear Tire & Rubber Company, Akron, Ohio, a corporation of Ohio
Filed Apr. 6, 1966, Ser. No. 540,759
Int. Cl. B29h 9/04; B65h 81/00; B32b 25/02
U.S. Cl. 156—441          1 Claim

ABSTRACT OF THE DISCLOSURE

A bias-cut sheet of reinforcing material for tire manufacture, is formed by encapsulating a tape of the reinforcing material in a rubber composition, winding the tape on a drum and uniting the edges into a band as it is wound, removing the freshly formed band from the equipment on which it is formed and starting a new band and severing the tape between the two bands, and then cutting the band from edge to edge at an angle to its axis and uniting several such cut bands at their respective cut edges to form a bias-cut sheet of the reinforcing material. Apparatus is disclosed.

---

This invention relates to the continuous production of rubber bands reinforced with fibrous materials, intended primarily for the production of plies therefrom suitable for use in the manufacture of tires, etc. It includes the process and apparatus therefor.

The invention involves the production of a band of reinforced rubber from a tape composed of elongated reinforcing material, such as wire or cords of rayon, polyester, nylon or other suitable filamentary material. The tape is encapsulated in rubber by passing the elongated reinforcing material through an extruder head, thereby coating the reinforcing material with rubber.

Such a tape is wound helically on a suitable base, and a plurality of bands are made in succession with each successive turn of the tape for each band adjacent to the prior turn; and the different turns are adhered to one another to form a band. When a band of suitable width has been formed, the next tape is spaced from the completed band by moving the machine elements or narrowing the tape, and a new band is started, the two bands being connected by a portion of the tape which is not laterally united to either band. As the bands are formed by addition of tape to one edge thereof, they are progressively removed from the winder on which they are formed and received on a take-up device which may be located permanently at the end of the winder or may be one of a series of take-up devices on a moving belt, or any other suitable arrangement may be used. The bands are then preferably cut across the tapes at an appropriate angle to form a reinforced rubber ply which is suitable for use in the manufacture of tires, etc. The process finds particular applicability to the manufacture of bias-cut plies in which the cut edge is not parallel to the axis of the band.

The apparatus is so designed that as the band is formed, it "walks off" of the winder. The winder keeps rotating as the band is removed, and this tends toward great economy of time, and increases the possibble output from a single unit. The operation is much less expensive than the present calendering methods of producing bias-cut plies and the installation cost is very appreciably less.

The invention will be described more particularly as carried out with tape made from polyester cords, and the production of bands therefrom as described in my application Ser. No. 440,084, filed Mar. 16, 1965 (now U.S. 3,421,958). A plurality of bands are formed united by a short length of tape which is cut to separate them.

Then the bands are slit to open them up and united to produce a tire ply. The description of the apparatus and operation as disclosed in that application are incorporated herein by reference, insofar as applicable.

The invention is further described in connection with the accompanying drawings, in which:

FIGURE 3 is an enlarged plan view of a winder and a take-up device on to which a band is delivered from the winder;

FIGURE 4 is an end view of the winder on the line 4—4 of FIGURE 3;

FIGURE 5 is a side view of the apparatus shown in FIGURE 3;

FIGURES 6 and 7 are enlarged plan and side views of a preferred type of winder drum with multiple screws installed therein;

FIGURE 8 is a modification of the winder shown in FIGURE 3;

FIGURE 9 is a further modification of the winder shown in FIGURE 3, with a portion of the band and its support broken away;

Figure 1:
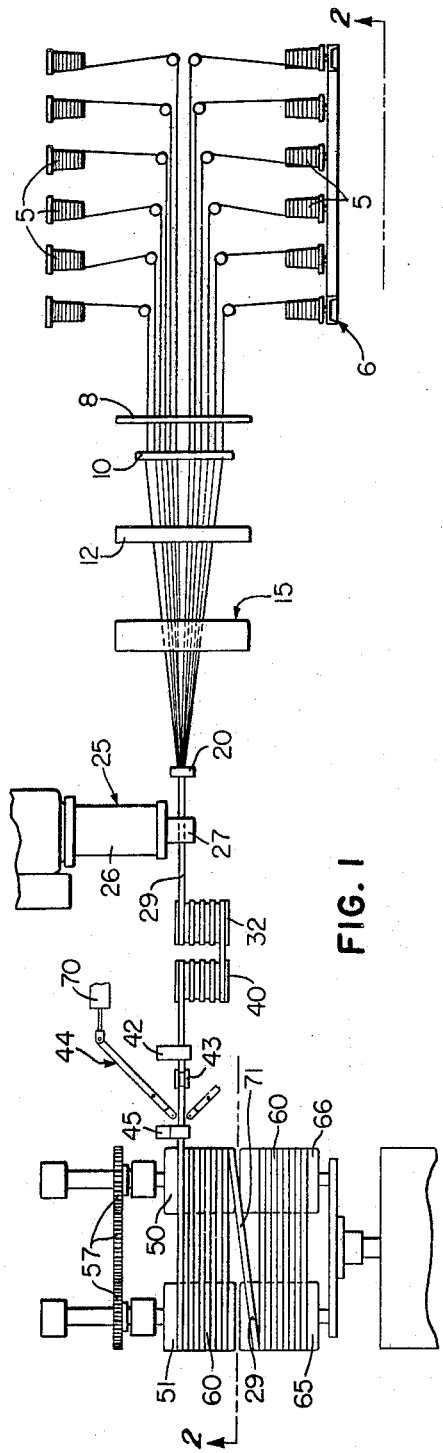
FIGURE 1 is a plan view, in the nature of a flow sheet, showing the different units of the apparatus and the method in which they are employed.
Figure 2:
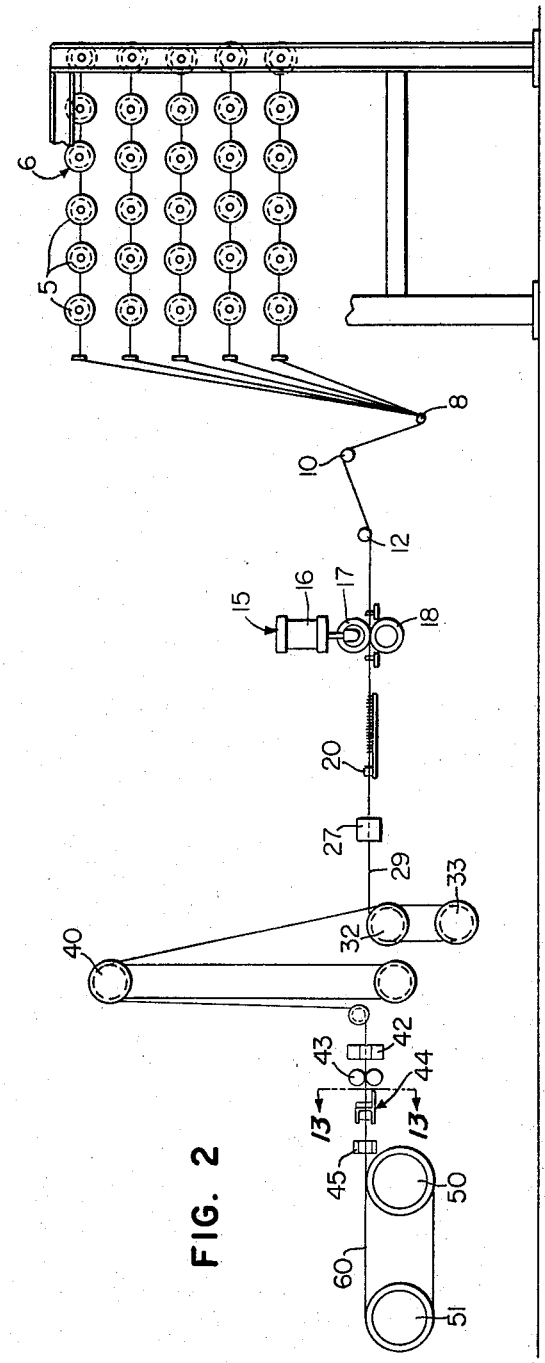
FIGURE 2 is an elevation of the equipment shown in FIGURE 1 taken on the line 2—2.

In carrying out the invention on apparatus of the type illustrated, the polyester or other cords are spliced off from let-offs 5 in the creel 6. They pass under the roll 8 to individual tension compensators 10, and then under the roll 12. They then pass through any type of tension-relief device illustrated schematically at 15 as comprising a cylinder 16 which presses a rubber-covered roll 17 against the steel roll 18. Here the tension on the cords is reduced from about 5 pounds to one pound or thereabouts. Any suitable means may be employed to insure that all of the cords are under the same low tension so that the tapes when formed will lie flat. If the tension from cord to cord is not the same, the tape will ripple laterally, i.e. from side to side, when the tension is released. If the tension is too high, e.g. greater than about 1.5 pounds for a 1000/3 polyester tire cord, the tape will ripple longitudinally when the tension is released.

It is desirable to here pass the cords through comb 20. From here they pass through the encapsulator 25. Rubber is fed through extruder 26 into the encapsulator head 27 where the rubber is extruded around the cords, positioned side-by-side, to form the tape 29.

The tapes are pulled through the equipment by the pull rolls 32 and 33 which are driven by suitable means. The festoon 40 takes up slack as it occurs from time to time.

From guide 42 the tape passes through rolls 43. The means employed for feeding the tape to the winder may vary. The drawing shows the tape passing through the arms of an intermittent trimming device 44 and then through trimming device 45 to shape the edges so that they properly abut one another on the winder. The tape edges are preferably slanted so that they overlap on the winder. They are preferably shaped by parallel, slanted, hot wires as more particularly described in said application Ser. No. 440,084 (now U.S. 3,421,958) to produce beveled edges which adhere to one another as succeeding turns of the tape are supplied to the winder. Pressure may be applied as fresh tape is brought into contact with the partially formed band, and cement may be applied as required. It is preferable to use rubber of sufficient tack to make such expedients unnecessary. Various types of winders and take-off devices may be used. Those illustrated are suggestive of what may be employed.

The two drums 50 and 51 of the winder are of uniform diameter throughout their respective lengths and are supported at one end in bearings 53. They are driven by a motor (not shown) through gears 57 (FIGURE 3). The mounting is such that the tension of the tape does not bring the outer ends of the rollers together and means is provided to cause the band 60 which is formed to walk off these ends at the same rate that new tape is supplied to the winder. Alternatively, the winder may be constructed with the outer ends tapered or their axes directed together at a predetermined angle, so as to cause the tape to walk toward the outer ends as it is formed.

Figure 13:
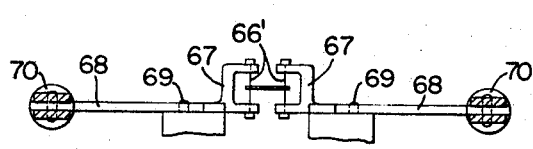
FIGURE 13 is an elevation of tape-narrowing equipment on the line 13—13 of FIGURE 2.
Figure 14:
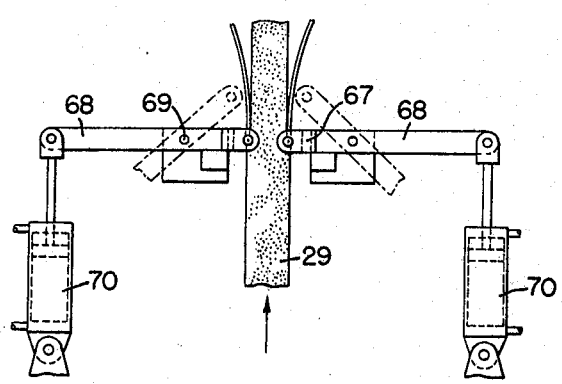
FIGURE 14 is a plan view of the same.

After a predetermined number of revolutions of the winder, the band that is formed is transferred from the winder 50, 51 to the receiver 65, 66. This may be done by movement of the tape feed with respect to the winder, or movement of the winder with respect to the tape feed or other means. This may be facilitated by inclusion of an intermittent trimming device such as that shown at 44. This includes vertical hot wires 66' (FIGURE 13) held in yokes 67 on arms 68 pivoted at 69 to be moved by cylinders 70 toward the tape 29 and then away from it at timed intervals. When the wires are moved in, the cut away edges of the tape 29 (as shown in full lines in FIGURE 14) form two narrow strips of rubber scrap. This narrows the tape by cutting away the beveled edges sufficiently so that the narrow tape is not united either to the band just formed or the band to be formed, producing a short, narrow length 71 of tape which connects each new band to the band already formed. As each band walks off of the winder on to the receiver it is preferably spaced from the next band, as by having the drums 65, 66 of the receiver move axially away from the winder and then gradually return to their original position during the formation of the new band. Any suitable means for accomplishing this is provided.

After the band is on the receiver the tape 71 is cut, separating the bands.

Figure 10:
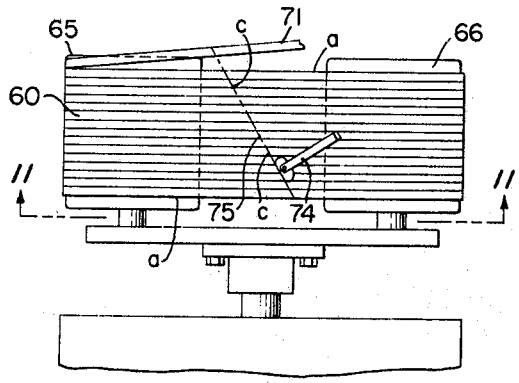
FIGURE 10 is an enlarged plan view of the band on the take-up with a knife for cutting the same.
Figure 11:
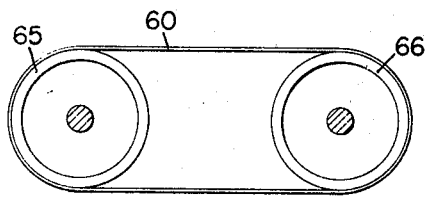
FIGURE 11 is a section on the line 11—11 of FIGURE 10.

The band is slit by roller knife 74 (FIGURE 10) at any desired angle, preferably an angle not parallel to the axis of the band. The line 75 (FIGURE 10) is illustrative. The resulting ply is removed from the rollers 65 and 66.

Figure 12:
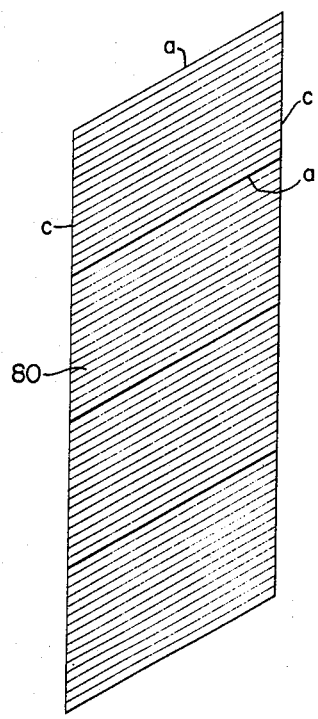
FIGURE 12 shows four plies of reinforced, rubber-covered, bias-cut fabric sized for use in a passenger tire.

The width between the edges c of the resulting sheet is normally much wider than the desired ply width for a tire, so this sheet will be cut into several sections along lines parallel to line 75 to produce the proper ply width indicated by letters c, c in FIGURE 12. Usually several plies so formed are united (as by abutting their edges a, a, and pressing them together) to form a long ply 80 (FIGURE 12). In this ply the cord reinforcements lie at angle to the side edges, the angle being determined by the angle of the line 75 to provide a desired bias angle for use in a particular tire.

The winder drums need not be cylindrical, as illustrated by the tapered rollers 90 of FIGURE 8. Instead of tapering the rollers, the band may be formed on a tapered belt 94 located around cylindrical rollers 95, as illustrated in FIGURE 9.

FIGURES 6 and 7 are enlarged views of a preferred type of drum, two of which would be used in the winder. The multiple screws 101 are driven by the gears 104 meshing with gear 102 and cause the band to move toward the exit end of the drums.

I claim:
1. Apparatus for the production of rubber-covered bands reinforced with filamentary material which comprises a winder for the formation of a band thereon which includes a drum and means for rotating the drum, together with means for guiding a rubber-covered tape to the winder and forming the band thereon, the winder surface being composed of laterally spaced substantially parallel screws which form a supporting surface for the band and means is provided for rotating the screws simultaneously to move a band over the surface of the winder.

References Cited

UNITED STATES PATENTS

| | | | |
|---|---|---|---|
| 1,217,879 | 2/1917 | Pye | 156—174 |
| 2,954,815 | 10/1960 | Kuts | 156—181 X |
| 3,082,140 | 3/1963 | Vanzo | 156—397 X |
| 3,113,738 | 12/1963 | Vanzo | 156—397 X |

HAROLD ANSHER, Primary Examiner

J. C. GIL, Assistant Examiner

U.S. Cl. X.R.

156—169, 181, 192, 446, 510